(12) United States Patent
Pliss et al.

(10) Patent No.: US 8,181,177 B1
(45) Date of Patent: May 15, 2012

(54) REDUCING THE NUMBER OF HEAP HANDLES IN A PROGRAM

(75) Inventors: Oleg A. Pliss, Santa Clara, CA (US); Kinsley Wong, San Francisco, CA (US); Ioi K. Lam, Mountain View, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1612 days.

(21) Appl. No.: 11/581,820

(22) Filed: Oct. 16, 2006

(51) Int. Cl.
*G06F 9/46* (2006.01)

(52) U.S. Cl. ........................................ 718/100; 718/107
(58) Field of Classification Search .................. 718/100, 718/107

See application file for complete search history.

(56) References Cited

U.S. PATENT DOCUMENTS

| | | | | |
|---|---|---|---|---|
| 6,618,738 B2 * | 9/2003 | Ozawa et al. | .......... | 707/999.206 |
| 6,816,956 B1 * | 11/2004 | Benayon et al. | .............. | 711/170 |
| 6,912,553 B1 * | 6/2005 | Kolodner et al. | ...... | 707/999.206 |
| 7,584,232 B2 * | 9/2009 | Guo | ........................ | 707/999.206 |
| 7,827,375 B2 * | 11/2010 | Abrashkevich et al. | ...... | 711/170 |
| 2005/0188164 A1 * | 8/2005 | Ballantyne et al. | ........... | 711/159 |

* cited by examiner

*Primary Examiner* — Andy Ho
(74) *Attorney, Agent, or Firm* — Park, Vaughan, Fleming & Dowler LLP; Mark Spiller (57) ABSTRACT

One embodiment of the present invention provides a system that reduces the number of heap handles in a program. First, the system builds an intermediate representation of the program. The system then analyzes the intermediate representation to determine whether executing a function may cause a garbage-collection operation. If so, the system further analyzes the program to determine whether a heap handle in the program is defined and/or used in proximity to a call to the function. Next, the system determines whether the heap handle can be replaced by an ordinary pointer, in order to facilitate subsequently converting the heap handle to an ordinary pointer, if possible. Note that converting a heap handle to an ordinary pointer reduces the space requirements for the program and increases the speed and efficiency of the program and garbage collection operations.

20 Claims, 6 Drawing Sheets

REDUCING THE NUMBER OF HEAP HANDLES IN A PROGRAM

BACKGROUND

1. Field of the Invention

The present invention relates to techniques for increasing the efficiency of software on mobiles devices. More specifically, the present invention relates to a method and an apparatus for reducing the number of heap handles in a program, which reduces the effort and resources involved in manipulating the heap handles.

2. Related Art

The Java 2 Platform, Micro Edition (J2ME™), has become a very popular software platform for memory-constrained devices such as wireless devices. Motorola, Nokia, NTT DoCoMo, RIM, Siemens, and many other key players in the wireless device industry have shipped a large number of J2ME™-enabled devices. In fact, over one billion J2ME™-enabled mobile phones have been shipped during the past few years.

A number of techniques for conserving memory have been developed in order to effectively run applications on such memory-constrained computing devices. One such technique uses exact garbage collection on a shared heap to reclaim memory that is no longer in use. Exact garbage collection uses precise knowledge about all pointers to the heap and between heap objects when scanning and relocating objects. Pointers to the heap are often referred to as "heap roots," and typically include static pointers and local heap pointers in stack frames.

Exact garbage collection is often implemented using a programming language which is not associated with a garbage-collected heap. For instance, a J2ME™ virtual machine might be written using the C or C++ programming languages. The compilers for such languages are typically unaware of garbage collection, and often do not provide support for locating heap pointers in stack frames. Without such dedicated language support, heap pointers in programs are typically implemented using special structures known as "heap handles." These heap handles are typically allocated on the stack and require proper management. For instance, heap handles need to be: initialized; inserted into the "root set" of heap roots; and removed after use. Note that the root set is often implemented as a linked list of heap handles.

Using heap handles incurs both direct and indirect costs. For instance, additional code needs to be generated and executed to insert and remove heap handles from the root set, and heap handles consume more memory than ordinary pointers in stack frames. Additionally, compilers that are unaware of heap-handle semantics cannot optimize heap handles in the same manner as ordinary pointers, since heap handles are typically at least two-field data structures, and heap handles escape local scope the moment they are added into the root set. Furthermore, if a heap handle is not promptly removed from the root set or set to null after the corresponding object for the heap handle is used, the garbage collector considers the object to be reachable, and does not dispose of the object.

Hence, what is needed is a method and an apparatus that reduces the above-described costs of manipulating heap handles where possible.

SUMMARY

One embodiment of the present invention provides a system that reduces the number of heap handles in a program. First, the system builds an intermediate representation of the program. The system then analyzes the intermediate representation to determine whether executing a function may cause a garbage-collection operation. If so, the system further analyzes the program to determine whether a heap handle in the program is defined and/or used in proximity to a call to the function. Next, the system determines whether the heap handle can be replaced by an ordinary pointer, in order to facilitate subsequently converting the heap handle to an ordinary pointer, if possible. Note that converting a heap handle to an ordinary pointer reduces the space requirements for the program and increases the speed and efficiency of the program and garbage collection operations.

In a variation on this embodiment, the system builds the intermediate representation of the program by: identifying function definitions in the program; determining the control flow for the program; identifying function calls in the program; identifying declared heap handles in the program; identifying assignments to heap handles in the program; and identifying uses of heap handles in the program. The intermediate representation can be viewed as a graph with nodes of identified items connected by annotated edges that denote relationships between the items.

In a variation on this embodiment, the system analyzes the intermediate representation of the program by performing call graph analysis.

In a further variation, the system performs call graph analysis by receiving a set of functions that may cause a garbage-collection operation. For instance, the system can perform call graph analysis starting from a user-specified set of the lowest-level garbage collection operations. The system then traverses the call graph of the program and propagates the "possibly garbage-collecting" property to the callers to determine which functions potentially call functions that can potentially trigger a garbage-collection operation.

In a further variation, the system receives the identities for a set of functions which cannot trigger a garbage-collection operation. The systems prevents these functions from being added to the set of functions that may cause a garbage-collection operation.

In a further variation, functions that may cause a garbage-collection operation include: a function that allocates memory; and/or a function that explicitly requests a garbage-collection operation.

In a variation on this embodiment, the system analyzes the program to determine whether a heap handle is defined and/or used in proximity to a function call that might result in a garbage-collection operation. In doing so, the system determines whether the heap handle has a non-null value when the function is called and determines whether the heap handle is used after the call to the function.

In a variation on this embodiment, a virtual machine maintains a list of heap handles to facilitate determining active regions of a memory space. By converting a heap handle in the list of heap handles to an ordinary pointer, the system can eliminate an additional field used for list management as well as instructions used for adding and removing the heap handle to and from the list of heap handles.

In a variation on this embodiment, the system analyzes an ordinary pointer in the program to determine whether using the ordinary pointer could result in an error and the ordinary pointer should be replaced by a heap handle.

In a further variation, the system additionally identifies and eliminates the unnecessary use of heap handles and/or incorrect use of ordinary pointers to improve program correctness and efficiency.

In a further variation, the system identifies a set of heap handles that can be grouped together. The system then groups these handles together, thereby improving efficiency by allowing the handles to be added and removed in bulk from the list.

In a further variation, the system identifies two heap handles that occur in separate scopes in the program. Because the two heap handles are in separate scopes, the system can then represent them using a single heap handle, thereby reducing the number of instructions needed to add and remove the heap handles from the list. Between the scopes the system assigns a null value to the combined handle.

In a variation on this embodiment, the system facilitates converting a heap handle to an ordinary pointer by: automatically converting the heap handle to an ordinary pointer; and/or identifying the heap handle to a programmer so that the programmer can convert the heap handle to an ordinary pointer.

In a variation on this embodiment, the system identifies the last use of the heap handle in the function and determines that the heap handle can be unlinked after this last use. By unlinking the heap handle after the last use, the system increases the efficiency of garbage-collection operations.

BRIEF DESCRIPTION OF THE FIGURES

Table 1 illustrates a section of code containing a heap pointer in accordance with an embodiment of the present invention.

Table 2 illustrates a first section of code in which a heap pointer can be eliminated in accordance with an embodiment of the present invention.

Table 3 illustrates a second section of code in which a heap pointer can be eliminated in accordance with an embodiment of the present invention.

Table 4 illustrates a third section of code in which a heap pointer can be eliminated in accordance with an embodiment of the present invention.

Table 5 illustrates a section of code that involves a number of link and unlink operations in accordance with an embodiment of the present invention.

Table 6 illustrates a section of code with grouped heap pointers in accordance with an embodiment of the present invention.

Table 7 illustrates a section of code with a re-used heap pointer in accordance with an embodiment of the present invention.

Table 8 illustrates a section of code in which the system can reduce the live range of a heap handle in accordance with an embodiment of the present invention.

Table 9 illustrates a section of code in which the system has reduced the live range of a heap handle in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Heap Handles

Virtual machines that are designed for resource-constrained devices typically are expected to operate in a small memory space yet still provide reasonable performance. However, garbage collection in such devices can seriously degrade performance.

The commonly-used technique of exact garbage collection requires precise knowledge of all pointers to the heap and between objects of the heap. When invoked, an exact garbage collector typically scans objects from a set of roots that encompass all external references to the heap to determine which objects are no longer in use and occupying space that can be reclaimed. Some of the root set can be located in static memory, for instance in a few known static variables containing references to the heap. However, many of the roots in the root set are dynamic roots found in local variables in stack frames, and thus are created and destroyed during program execution.

Programming languages designed for garbage collection may include special data structures that reduce the cost of scanning objects from the root set during garbage collection. Such programming languages, however, cannot eliminate the scanning overhead completely, because such programming languages must still refer to the resulting object maps and/or tables in memory. Furthermore, virtual machines are often written in languages not designed for garbage collection, such as C or C++, which do not include special data structures to reduce the cost of garbage collection.

Distinguishing between ordinary pointers and pointers to the heap in such a programming language which is not designed for garbage collection typically involves additional overhead. In one possible implementation, the system tracks heap pointers using a singly-linked list of stack-allocated structures with two fields, where one of these fields points to the heap and the other points to the next element of the list.

Such structures (called "heap handles," or in the context of a local stack frame, "local heap handles") are allocated in the stack frame (activation record) of a function, and are registered in the root set when created and removed from the set when destroyed.

Figure 1A:
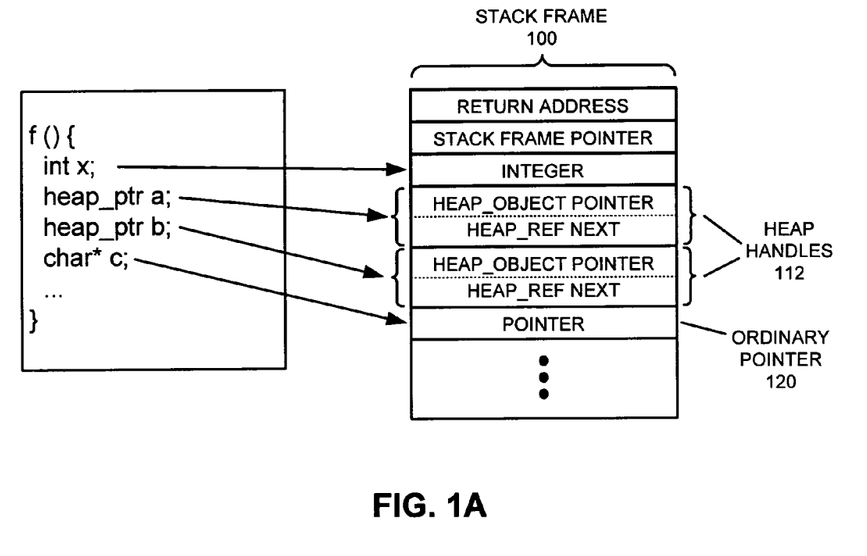
FIG. 1A illustrates a stack frame for a function in accordance with an embodiment of the present invention.

FIG. 1A illustrates a stack frame 100 for a function f( ) that includes several heap pointers. The resulting heap handles 112 in the stack frame 100 include two fields, a pointer to a heap object and a pointer to the next heap handle in the list. An ordinary pointer 120 in the stack frame, in comparison, only includes a single field.

Figure 1B:
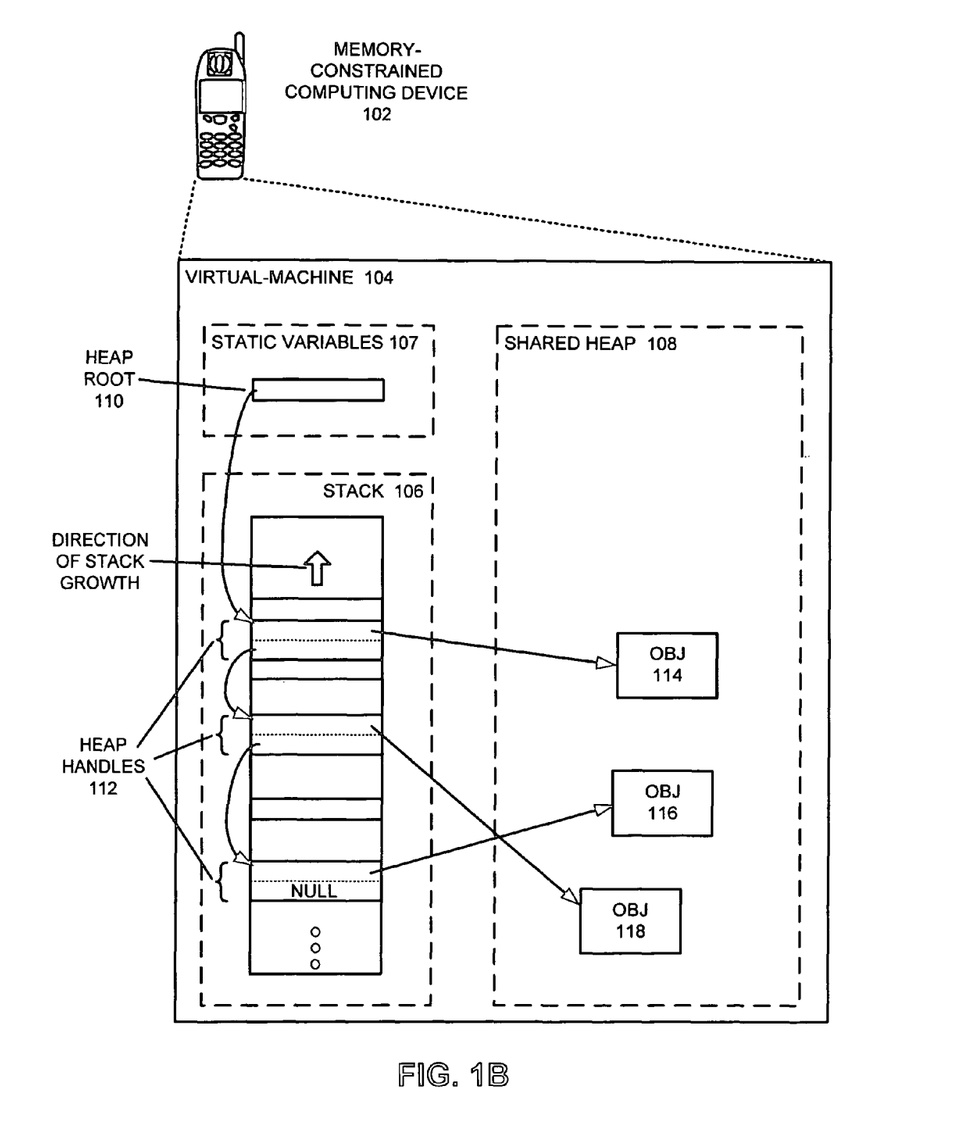
FIG. 1B illustrates a memory-constrained computing device with a virtual machine in accordance with an embodiment of the present invention.

FIG. 1B illustrates a memory-constrained computing device 102 with a virtual machine 104. The system includes a stack 106, static variables 107, and a shared heap 108. The heap root 110 is a static variable that serves as the head of the linked list of local heap handles 112, and points to the uppermost heap handle in the stack. The first fields of the heap handles point to objects 114-118, and the second fields pointing to the next heap handle 112 (respectively) in the list.

Managing a linked list of heap handles typically involves a maintenance cost. For example, adding and removing entries to and from the linked list typically involves at least three memory operations, thereby increasing the size of the program binary and causing longer execution times. Moreover, adding an additional field for list pointers also increases the amount of stack space used. Also, using global pointers to reference the linked lists allows the structure to escape local scope. Since all local heap handles are linked to the list with the global root, as soon as the address of a structure is assigned to a non-local pointer, from the compiler's perspective the structure has escaped the local scope. As a result, the compiler cannot keep track of all the references to the structure that may occur at run time. Such references are free to spread widely from the non-local pointer to any other non-local pointers, including fields of heap and stack objects. As a result, the compiler has to make worst-case assumptions, and be very cautious in not performing any optimizations for such structures. Another problem is that objects which are referred to by heap handles instead of ordinary pointers may still be considered "live" (from the viewpoint of the garbage collector) for an additional timeframe, even through they will not be used again. Hence, because the efficiency of garbage collection can be measured by the amount of space freed in comparison to the amount of work performed during the garbage collection operation, using heap pointers can lead to decreased garbage-collection efficiency and can cause delay in reclaiming memory space.

These additional costs for using heap pointers motivate programmers to eliminate as many heap pointers as possible. A programmer can choose to manually change a heap pointer into an ordinary pointer. However, to determine that such a change is "safe" typically requires precise global knowledge of memory allocations throughout the entire application. Moreover, a minor modification of the application can make ordinary pointers unsafe in some functions, and manually choosing between ordinary pointers and heap pointers can be error-prone and miss many opportunities to improve efficiency.

One embodiment of the present invention facilitates reducing the number of heap handles in a program to improve the efficiency of exact garbage collection in a single native-threaded application.

Reducing Heap Handles

One embodiment of the present invention determines whether heap handles in a program can be replaced by ordinary pointers. A heap handle is an external reference to the heap that is registered in the set of heap roots and hence known to the garbage collector. A garbage collector uses such heap handles to trace reachable objects and to adjust handles when the objects move. A heap handle is necessary only if an object is assigned to the heap handle at garbage collection time and the heap handle is used after the garbage collection time to reach the object. Otherwise, the heap handle can be safely transformed to an ordinary pointer, thereby reducing list management overhead. The system determines whether heap handles can be replaced by analyzing the use of heap handles in correlation with functions that can potentially trigger garbage-collection operations.

Figure 2:
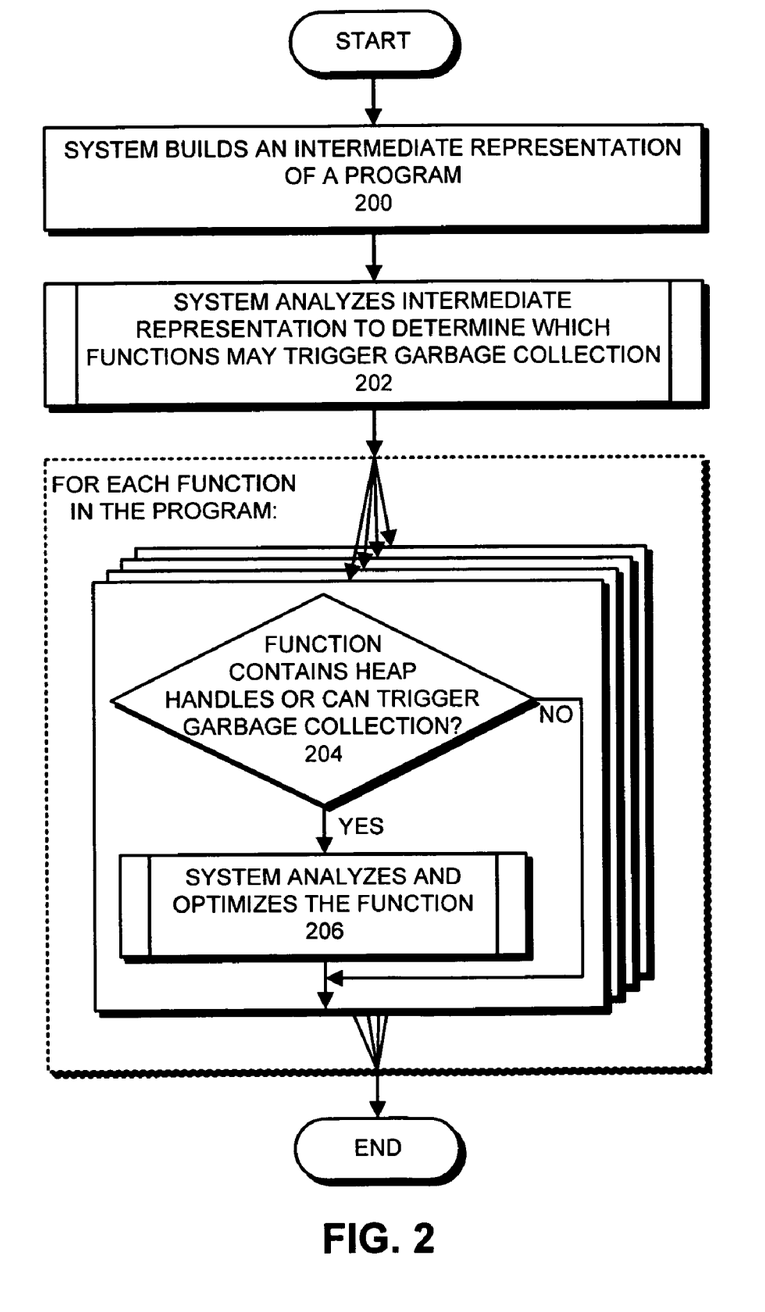
FIG. 2 presents a flow chart illustrating the process of reducing the number of heap handles in a program in accordance with an embodiment of the present invention.

FIG. 2 presents a flow chart illustrating the process of identifying unneeded heap pointers/handles in a program. First, the system builds an intermediate representation of the program (step 200). The system then analyzes this intermediate representation to determine which functions may trigger a garbage-collection operation (step 202). Then, for each function in the program, the system proceeds to check whether the function contains heap handles or contains heap handles (step 204), and, if so, analyzes and optimizes the function (step 206).

Figure 3:
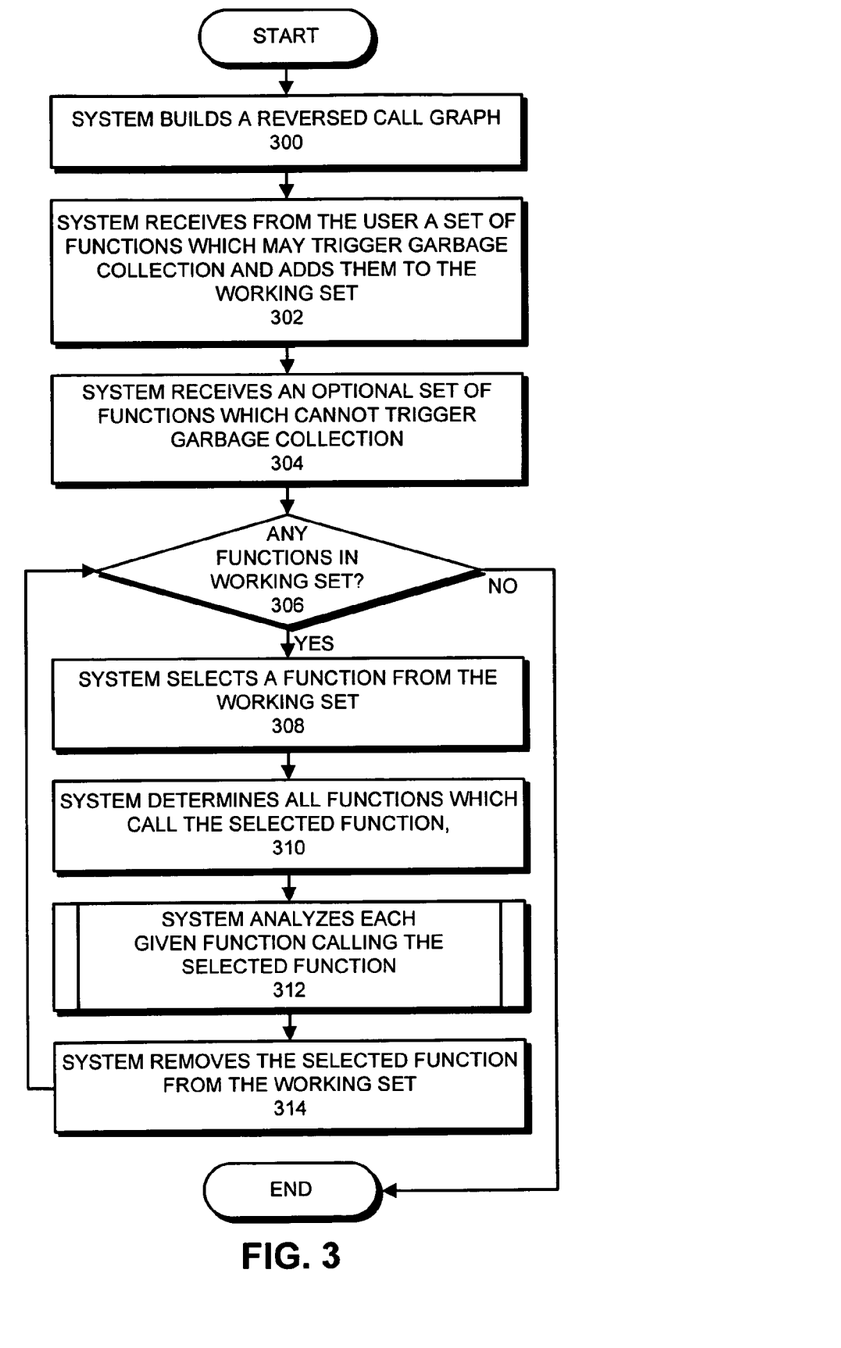
FIG. 3 presents a flow chart illustrating the process of analyzing an intermediate representation of a program to determine which functions may trigger garbage collection in accordance with an embodiment of the present invention.

FIG. 3 presents a flow chart illustrating the process of analyzing an intermediate representation of a program to determine which functions may trigger garbage collection. First, the system builds a reversed call graph (step 300). The system then receives from the user a set of functions which may trigger garbage collection, and adds them to the working set (step 302). The system may also optionally receive a set of functions which cannot trigger garbage collection (step 304). Next, if the working set is not empty (step 306), the system proceeds to pick a function from the working set (step 308). The system determines all functions which call the selected function (step 310). Note that, depending on the programming language and programming language usage, this process may involve complex analysis. For instance, in order to resolve the sets of calling functions, the system may need to analyze and identify virtual function calls, function pointers, and functions passed as arguments. Next, the system proceeds to analyze each given function that calls the selected function to determine whether the given function belongs to the set of functions that may trigger garbage collection (step 312), as described in FIG. 4. After analyzing each given function that calls the selected function, the system then removes the selected function from the working set (step 314), and then proceeds to select another function from the working set, if available.

Figure 4:
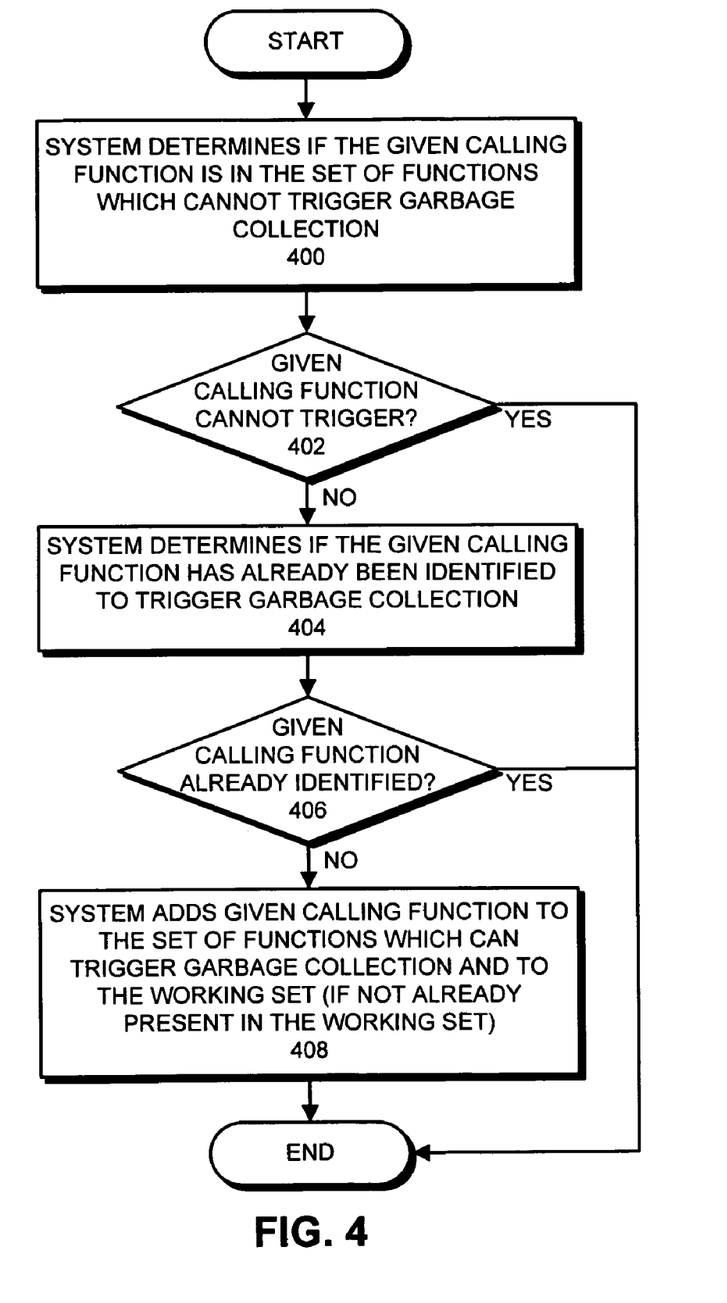
FIG. 4 presents a flow chart illustrating the process of analyzing a function to determine whether the function belongs to the set of functions that may trigger garbage collection in accordance with an embodiment of the present invention.

FIG. 4 presents a flow chart illustrating the process of analyzing a function to determine whether the function belongs to the set of functions that may trigger garbage collection. First, the system determines if the given calling function is in the set of functions which cannot trigger garbage collection (step 400). If the given calling function is not in this set of non-triggering functions (step 402), the system next determines if the given calling function is in the set of functions already identified to trigger garbage collection (step 404). If the given calling function has not already been identified to trigger garbage collection (step 406), the system proceeds to add the given calling function to the set of functions that may trigger garbage collection and to the working set (step 408), if the function is not already present in the working set.

Figure 5:
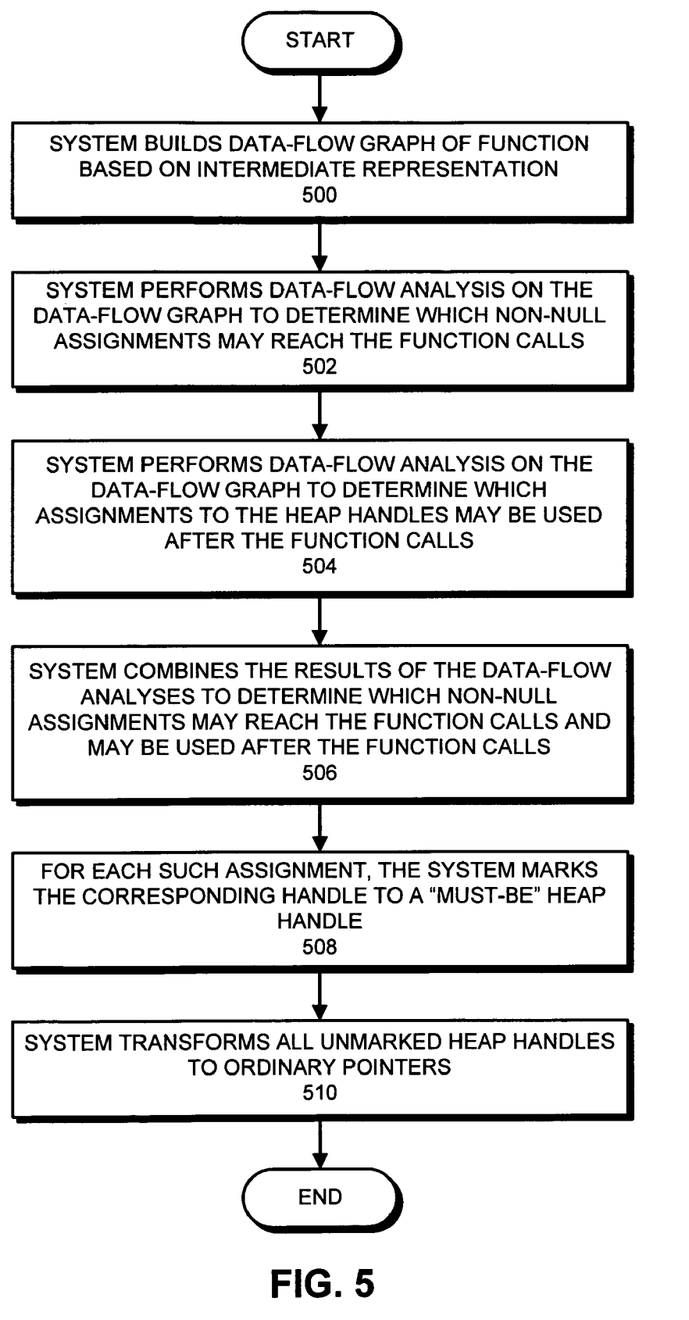
FIG. 5 presents a flow chart illustrating the process of analyzing and optimizing a function that contains heap handles or can trigger garbage collection in accordance with an embodiment of the present invention.

FIG. 5 presents a flow chart illustrating the process of analyzing and optimizing a function that contains heap handles or can trigger garbage collection. First, the system builds a data-flow graph of the function based on the intermediate representation (step 500). This graph consists of basic block nodes connected with control-flow edges. A basic block consists of function calls and statements using or assigning values to heap handles. The system only considers calls to functions which can trigger garbage collection, and ignores all other functions. Next, the system performs data-flow analysis on the data-flow graph to determine which non-null assignments to heap handles may reach the function calls (step 502). Then, the system performs data-flow analysis on the data-flow graph to determine which assignments to heap handles may be used after the function calls (step 504). The system combines the results of these data-flow analyses to determine which non-null assignments may reach the function calls and may be used after the function calls (step 506), and for each such assignment marks a corresponding heap handle as a "must-be" heap handle (step 508). At the end of the analysis of the function, the system transforms all unmarked heap handles to ordinary pointers (step 510).

In one embodiment of the present invention, building the intermediate representation of the program involves: identifying function definitions in the program; determining the control flow of the program; identifying the function calls of the program; identifying declared heap handles in the program; identifying assignments to heap handles in the program; and identifying uses of heap handles in the program. The intermediate representation can be viewed as a graph with nodes of such identified items connected by annotated edges that denote relationships between the items. This intermediate representation can be stored in a number of ways, for instance by storing the results in a file or keeping the results in memory.

Next, the system analyzes this intermediate representation using call graph analysis to identify a set of functions that may trigger garbage collection. Then, the system traverses the call graph of the program to identify the functions that in turn call this set of functions, thereby eventually determining every function call in the program that may trigger garbage collection. This technique can operate by marking a small, known set of entry points to the system's internal garbage-collection methods, and then traveling up the call-graph tree to the roots, marking any functions that call these methods (or ancestors of these methods) as potentially causing garbage-collection. For instance, any function that explicitly requests garbage collection or tries to allocate memory (and hence might trigger garbage collection) would be marked. Note that if the system cannot determine whether a given portion of the program can trigger garbage collection, the system can simply assume in the worst-case that the given portion can trigger garbage collection.

In a further embodiment, the system may receive a specification identifying functions which cannot trigger a garbage-collection operation. For instance, functions such as "exit" or "assert" may allocate memory to output error messages, but do not affect garbage collection since once they are called the flow of execution never returns to the program.

In one embodiment of the present invention, once the system has determined the set of function calls that may trigger garbage collection, the system analyzes the program using techniques such as iterative basic-block-level dataflow analysis to determine which heap handles are necessary. For instance, the system can perform reaching-definition analysis for every function to determine whether local heap pointers in the function can have a non-null value at the invocation of a potentially-garbage-collecting function. The system also checks whether a non-null local heap pointer is used (considered "live") after such a function call. If the heap pointer is set to null at the invocation of all the potentially-garbage-collection-triggering functions in the same scope, the corresponding heap handle can be replaced by an ordinary pointer. Similarly, if the heap pointer has a non-null value at the invocation of a potentially-garbage-collection-triggering function but is not used again after the invocation, the corresponding heap handle can be replaced by an ordinary pointer.

TABLE 1

```
{
  heap_ptr a = null;
  if (...) {
    a = new object ( );
    ...
  }
  f ( );
  if (a) {
    int val = a->val;
    ...
  }
}
```

Table 1 illustrates a section of program code in which, depending on whether the first "if" clause is executed, the heap pointer 'a' may have a non-null value at the time that the function f( ) is called. In this program, if the system determines that the function call f( ) potentially triggers garbage collection, the heap pointer cannot be eliminated. However, if the system determines that f( ) is not potentially garbage-collecting, the system can further determine that the heap pointer 'a' does not need to be preserved across a garbage-collection operation, and can be replaced by an ordinary pointer.

Tables 2-4 illustrate additional sections of program code in which a heap pointer can be eliminated. In Table 2 and Table 3, because the heap pointer 'a' is not "live" (used) after a potentially-garbage-collecting function f( ), the heap pointer can be replaced by an ordinary pointer. In Table 4, because heap pointer 'a' is null at the time of the call to potentially-garbage-collection-triggering function f( ), the heap pointer could similarly be replaced by an ordinary pointer.

TABLE 2

```
{
  heap_ptr a = null;
  if (...) {
    a = new object ( );
    ...
  }
  if (a) {
    int val = a->val;
    ...
  }
  f ( );
}
```

TABLE 3

```
{
  heap_ptr a = new object ( );
  f ( );
}
```

TABLE 4

```
{
  heap_ptr a = null;
  f ( );
  if (...) {
    ...
  }
}
```

Note that similar analysis can be used to determine whether ordinary pointers should be replaced by heap pointers. In one embodiment of the present invention, the system analyzes ordinary pointers in the program to determine whether an ordinary pointer should be replaced by a heap pointer. For instance, using an ordinary pointer in a section of code may initially be correct, but a later modification to the code that inserts a potentially-garbage-collection-triggering function could cause the object pointed to by the ordinary pointer to be reclaimed during use, which could result in an error or program incorrectness. In this situation, the system can determine that the ordinary pointer should be replaced by a heap pointer.

In one embodiment of the present invention, the system facilitates converting an unnecessary heap handle to an ordinary pointer. For instance, after determining that the heap pointer is unnecessary, the system might automatically convert the heap handle to an ordinary pointer. Alternatively, if users do not want the system to modify code, the system might instead identify the heap handle to a programmer, thereby enabling the programmer to convert the heap handle to an ordinary pointer, if desired. Note that the system may be further configured to output a detailed set of analysis information to programmers/users, who may choose to ignore such "hints."

In one embodiment of the present invention, the technique is applied to a single native-threaded application, such as an application running on a Java™ virtual machine that runs on a single native thread but provides multiple Java™ threads to applications and that implements exact garbage collection. In a single-threaded application, garbage collection can be caused only by direct or indirect invocation from a thread, and the system can determine the control logic and flow of the program based on compile-time analysis. The techniques described can also be applied to some multi-threading systems, depending on the implementation of the multi-threading system and scheduler. For instance, in a cooperative multi-threaded system, the system may be able to determine when control will be passed between threads, thereby allowing the system to predict when calls to potentially garbage-collecting functions may occur.

Note that converting a heap handle to an ordinary pointer does not change the referred-to object on the heap, but only potentially changes the timeframe in which the space occupied by the object will be reclaimed. While the heap handle may be reduced to an ordinary pointer, additional references (e.g. a global pointer) to the object may keep the object "live" in the view of the garbage collector, and can thereby prevent the object's space from being reclaimed.

Grouping, Re-Using, and Unlinking Heap Handles

In one embodiment of the present invention, the system determines whether heap pointers can be grouped together in the source code to improve the efficiency of linking and unlinking the associated heap handles from the linked list of heap handles. For instance, the program code illustrated in Table 5 causes a number of individual link and unlink operations. To reduce the number of such operations, the system can analyze the code and identify situations in which the scope of heap pointers can be expanded, without affecting program correctness, to group heap pointers such that the link and unlink operations can be optimized. For instance, Table 6 illustrates the program code shown in Table 5 modified so that heap pointers 'b' and 'c' are grouped in proximity to and in the same scope as heap pointer 'a'.

TABLE 5

```
{
    heap_ptr a = new object( );           // link a in list
    {
        heap_ptr b = new object( );       // link b in list
        ...
        ...
    }                                      // unlink b
    {
        heap_ptr c = new object( );       // link c in list
        ...
        ...
    }                                      // unlink c
}                                          // unlink a
```

TABLE 6

```
{
    heap_ptr a = new object( );
    heap_ptr b = null;
    heap_ptr c = null;                    // link a,b,c in list
    {
        b = new object( );
        ...
    }
    {
        c = new object( );
        ...
    }
}                                          // unlink a,b,c
```

In one embodiment of the present invention, the system determines situations where heap pointers in different scopes can be re-used to reduce the overhead of linking and unlinking the associated heap handles from the list. For instance, for the program code shown in Table 5, heap pointers 'b' and 'c' occur in different scopes, and do not overlap. Instead of linking and unlinking both heap handles separately, the system (e.g. via the compiler) can allocate heap pointers 'b' and 'c' to one heap pointer, as shown in Table 7. Note that the system sets the resulting heap pointer 'ID' to null in the portion of the expanded scope between different scopes, both for program correctness and to reset the handle for the second (separate) scope.

TABLE 7

```
{
    heap_ptr a = new object( );           // link a in list
    heap_ptr b = null;                    // link b in list
    {                                      // Scope 1
        b = new object( );
        ...
    }                                      // End Scope 1
    b = null;
    {                                      // Scope 2
        b = new object( );
        ...
    }                                      // End Scope 2
}                                          // unlink a,b
```

In one embodiment of the present invention, the system reduces the live range of heap handles to optimize garbage collection. Table 8 illustrates a section of program code in which a heap pointer is assigned and used before any calls to garbage-collecting functions. During the execution of f( ), g( ), and other potentially-garbage-collecting functions, the object referenced by heap pointer 'a' is reachable through a heap handle, but not used. Because the garbage collector is not aware of future use of objects, only reachability is taken into consideration during garbage collection. Hence, if garbage collection occurs during the execution of f( ), g( ), or the other potentially-garbage-collecting functions, the whole set of objects directly or indirectly reachable through the handle for heap pointer 'a' will not be collected. The system can transform the code to the form shown in Table 9 and unlink the heap handle earlier (in proximity to the point of last use), so that the garbage collector can collect more garbage and thereby improve the efficiency of garbage collection. Note that reducing the live range of heap handles not only improves garbage collection efficiency, but also helps to prevent memory leaks that arise when a programmer forgets to destroy a heap handle or set the heap handle to null. In such situations, the heap handle may continue to refer to a (potentially large) set of otherwise unreachable objects that hence are not garbage-collected. Note also that if the heap handle is grouped, the unlink operation in Table 9 would be replaced by setting the heap pointer to null, to preserve group removal.

TABLE 8

```
{
    heap_ptr a = new object( );        // link a in list
    ...
    <last use of handle a>
    ...
    f( );
    g( );
    ...
    <other garbage-collecting function calls>
}                                      // unlink a
```

TABLE 9

```
{
    heap_ptr a = new object( );        // link a in list
    ...
    <last use of handle a>
    unlink(a)                          // unlink a
    ...
    f( );
    g( );
    ...
    <other garbage-collecting function calls>
}
```

In summary, using ordinary memory pointers instead of heap handles whenever it is safe to do so improves program and garbage collection efficiency. For example, one embodiment of the present invention uses global analysis to identify and eliminate unnecessary use of heap handles. Similar global analysis can also be used to identify and eliminate the incorrect use of ordinary pointers, thereby further improving program correctness and efficiency. Note that the techniques described can be integrated into a compiler, used to generate optimized source code, and/or used to analyze a program and provide a programmer with suggested source code modifications.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for reducing the number of heap handles in a program, comprising:
    building an intermediate representation of the program;
    analyzing the intermediate representation to determine whether executing a function may cause a garbage-collection operation;
    if the function can potentially cause a garbage-collection operation, analyzing the program to determine whether a heap handle in the program is defined and/or used in proximity to a call to the function; and
    determining whether the heap handle can be replaced by an ordinary pointer, to facilitate converting the heap handle to the ordinary pointer;
    whereby converting the heap handle reduces the space requirements for the program and increases the speed and efficiency of the program and garbage-collection operations.

2. The method of claim 1, wherein building the intermediate representation of the program involves:
    identifying function definitions in the program;
    determining a control flow for the program;
    identifying function calls in the program;
    identifying declared heap handles in the program;
    identifying assignments to heap handles in the program; and
    identifying uses of heap handles in the program;
    wherein the intermediate representation can be viewed as a graph with nodes of identified items connected by annotated edges that denote relationships between the items.

3. The method of claim 1, wherein analyzing the intermediate representation of the program further involves performing call graph analysis.

4. The method of claim 3, wherein performing the call graph analysis involves:
    receiving a first set of functions that may cause a garbage-collection operation, wherein the first set of functions includes the lowest-level functions of the garbage collector; and
    traversing a call graph of the program and extending the first set of functions by adding to the first set of functions the callers of the first set of functions' elements.

5. The method of claim 4,
    wherein performing call graph analysis further involves receiving a second set of functions which cannot trigger a garbage-collection operation; and
    wherein functions in the second set of functions cannot be added to the first set of functions.

6. The method of claim 1, wherein analyzing the program to determine whether the heap handle is defined and/or used in proximity to the call to the function involves:
    determining whether the heap handle has a non-null value when the function is called; and
    determining whether the heap handle is used after the call to the function.

7. The method of claim 1,
    wherein a virtual machine maintains a list of heap handles to facilitate determining active regions of a memory space; and
    wherein converting the heap handle to the ordinary pointer eliminates an additional field used for list management and instructions used for adding and removing the heap handle to and from the list.

8. The method of claim 1, wherein determining whether the heap handle can be replaced by the ordinary pointer further involves:
    analyzing an existing ordinary pointer in the program; and
    determining whether using the existing ordinary pointer could result in an error and therefore the existing ordinary pointer should be replaced by a replacement heap handle.

9. The method of claim 8, wherein identifying and eliminating unnecessary use of heap handles and/or incorrect use of ordinary pointers improves program correctness and efficiency.

10. The method of claim 7, wherein the method further comprises:
identifying a set of heap handles that can be grouped together; and
grouping the set of heap handles together;
wherein grouping together the set of heap handles allows the set of heap handles to be added and removed in bulk from the list, thereby improving efficiency.

11. The method of claim 7, wherein the method further comprises:
identifying a first heap handle and a second heap handle that occur in separate scopes in the program;
using a single heap handle to represent both the first heap handle and the second heap handle; and
assigning a null value to the single heap handle between the separate scopes in the program;
wherein using the single heap handle reduces the number of instructions needed to add and remove the first heap handle and the second heap handle from the list.

12. The method of claim 1, wherein facilitating converting the heap handle to the ordinary pointer involves:
automatically converting the heap handle to the ordinary pointer; and/or
identifying the heap handle to a programmer to enable the programmer to convert the heap handle to the ordinary pointer.

13. The method of claim 1, wherein the method further comprises:
identifying a last use of the heap handle in the function; and
determining that the heap handle can be unlinked after the last use;
wherein unlinking the heap handle after the last use increases the efficiency of garbage-collection operations.

14. A computer-readable storage medium storing instructions that when executed by a computer cause the computer to perform a method for reducing the number of heap handles in a program, the method comprising:
building an intermediate representation of the program;
analyzing the intermediate representation to determine whether executing a function may cause a garbage-collection operation;
if the function can potentially cause a garbage-collection operation, analyzing the program to determine whether a heap handle in the program is defined and/or used in proximity to a call to the function; and
determining whether the heap handle can be replaced by an ordinary pointer, to facilitate converting the heap handle to the ordinary pointer;
whereby converting the heap handle reduces the space requirements for the program and increases the speed and efficiency of the program and garbage-collection operations.

15. The computer-readable storage medium of claim 14,
wherein analyzing the intermediate representation of the program further involves performing call graph analysis; and
wherein performing the call graph analysis involves:
receiving a first set of functions that may cause a garbage-collection operation, wherein the first set of functions includes the lowest-level functions of the garbage collector; and
traversing a call graph of the program and extending the first set of functions by adding to the first set of functions the callers of the first set of functions' elements.

16. The computer-readable storage medium of claim 14, wherein analyzing the program to determine whether the heap handle is defined and/or used in proximity to the call to the function involves:
determining whether the heap handle has a non-null value when the function is called; and
determining whether the heap handle is used after the call to the function.

17. The computer-readable storage medium of claim 14,
wherein a virtual machine maintains a list of heap handles to facilitate determining active regions of a memory space; and
wherein converting the heap handle to the ordinary pointer eliminates an additional field used for list management and instructions used for adding and removing the heap handle to and from the list.

18. The computer-readable storage medium of claim 17, wherein the method further comprises:
identifying a set of heap handles that can be grouped together; and
grouping the set of heap handles together;
wherein grouping together the set of heap handles allows the set of heap handles to be added and removed in bulk from the list, thereby improving efficiency.

19. The computer-readable storage medium of claim 14, wherein the method further comprises:
identifying a first heap handle and a second heap handle that occur in separate scopes in the program;
using a single heap handle to represent both the first heap handle and the second heap handle; and
assigning a null value to the single heap handle between the separate scopes in the program;
wherein using the single heap handle reduces the number of instructions needed to add and remove the first heap handle and the second heap handle from the list.

20. An apparatus that reduces the number of heap handles in a program, comprising:
a build mechanism configured to build an intermediate representation of the program;
an analysis mechanism configured to analyze the intermediate representation to determine whether executing a function may cause a garbage-collection operation;
if the function can potentially cause a garbage-collection operation, the analysis mechanism is configured to analyze the program to determine whether a heap handle in the program is defined and/or used in proximity to a call to the function; and
a determination mechanism configured to determine whether the heap handle can be replaced by an ordinary pointer, to facilitate converting the heap handle to the ordinary pointer;
whereby converting the heap handle reduces the space requirements for the program and increases the speed and efficiency of the program and garbage-collection operations.

* * * * *